United States Patent
Zhang et al.

(10) Patent No.: US 11,301,846 B2
(45) Date of Patent: Apr. 12, 2022

(54) SYSTEM AND METHOD FOR INFORMATION PROTECTION

(71) Applicant: ADVANCED NEW TECHNOLOGIES CO., LTD., Grand Cayman (KY)

(72) Inventors: Wenbin Zhang, Hangzhou (CN); Lichun Li, Hangzhou (CN); Baoli Ma, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 16/870,662

(22) Filed: May 8, 2020

(65) Prior Publication Data

US 2020/0273028 A1  Aug. 27, 2020

Related U.S. Application Data

(63) Continuation of application No. 16/464,061, filed as application No. PCT/CN2018/125749 on Dec. 29, 2018.

(51) Int. Cl.
  *G06Q 20/38* (2012.01)
  *H04L 9/00* (2006.01)
  *H04L 9/06* (2006.01)

(52) U.S. Cl.
  CPC ... *G06Q 20/38215* (2013.01); *G06Q 20/3823* (2013.01); *H04L 9/008* (2013.01); *H04L 9/0637* (2013.01)

(58) Field of Classification Search
  None
  See application file for complete search history.

(56) References Cited

U.S. PATENT DOCUMENTS

| | | |
|---|---|---|
| 7,568,615 B2 | 8/2009 | Corona et al. |
| 9,569,771 B2 | 2/2017 | Lesavich et al. |

(Continued)

FOREIGN PATENT DOCUMENTS

| | | |
|---|---|---|
| CN | 106549749 A | 3/2017 |
| CN | 106845960 A | 6/2017 |

(Continued)

OTHER PUBLICATIONS

Liubin, Ivan, "Online Dispute Resolution in Russia and Europe—Current Situation and Prospects of Development", Jun. 7/Jun. 8, 2018, Economic and Social Development: Book of Proceedings: 197-203 (Year: 2018).*

(Continued)

*Primary Examiner* — Neha Patel
*Assistant Examiner* — Clay C Lee

(57) ABSTRACT

A computer-implemented information protection method comprises: obtaining a plurality of encrypted transaction amounts associated with transactions among a plurality of accounts, wherein each of the encrypted transaction amounts is associated with one of the accounts that sends or receives one of the transaction amounts, and the encryption of each of the transaction amounts at least conceals whether the one account sends or receives the one of the transaction amounts; generating a sum proof based on the obtained encrypted transaction amounts, the sum proof at least indicating that the transaction amounts are balanced; and transmitting the encrypted transaction amounts and the sum proof to one or more nodes on a blockchain network for the nodes to verify the transactions.

20 Claims, 7 Drawing Sheets

(56) References Cited

U.S. PATENT DOCUMENTS

| | | |
|---|---|---|
| 9,774,578 B1 | 9/2017 | Ateniese et al. |
| 9,990,504 B1 | 6/2018 | Chapman et al. |
| 10,022,613 B2 | 7/2018 | Tran et al. |
| 10,057,255 B2 | 8/2018 | Votaw et al. |
| 10,148,646 B2 | 12/2018 | Votaw et al. |
| 10,163,080 B2 | 12/2018 | Chow et al. |
| 10,262,351 B2 | 4/2019 | Boemi et al. |
| 10,270,599 B2 | 4/2019 | Nadeau et al. |
| 10,275,739 B2 | 4/2019 | Hanis et al. |
| 10,333,706 B2 | 6/2019 | Smith et al. |
| 10,339,523 B2 | 7/2019 | Mcdonough et al. |
| 10,615,960 B2 | 4/2020 | Zhang et al. |
| 10,817,872 B2 | 10/2020 | Lin |
| 11,080,665 B1 | 8/2021 | Poelstra et al. |
| 2004/0260926 A1 | 12/2004 | Arditti Modiano et al. |
| 2009/0136033 A1 | 5/2009 | Sy |
| 2010/0078471 A1 | 4/2010 | Lin et al. |
| 2013/0073432 A1 | 3/2013 | Mulholland |
| 2013/0238491 A1 | 9/2013 | Bouey et al. |
| 2013/0254098 A1 | 9/2013 | Holland |
| 2014/0334622 A1 | 11/2014 | Smyth et al. |
| 2015/0088756 A1 | 3/2015 | Makhotin et al. |
| 2015/0333905 A1 | 11/2015 | Parann-nissany et al. |
| 2016/0078431 A1* | 3/2016 | Ramachandran .. G06Q 30/0605 705/64 |
| 2016/0162897 A1* | 6/2016 | Feeney ................ G06Q 20/065 705/71 |
| 2016/0253663 A1 | 9/2016 | Clark et al. |
| 2016/0260160 A1 | 9/2016 | Cheng et al. |
| 2016/0261411 A1 | 9/2016 | Yau et al. |
| 2016/0275461 A1 | 9/2016 | Sprague et al. |
| 2016/0314462 A1 | 10/2016 | Hong et al. |
| 2016/0342978 A1 | 11/2016 | Davis et al. |
| 2016/0358165 A1* | 12/2016 | Maxwell ............ G06Q 20/0655 |
| 2017/0046698 A1 | 2/2017 | Haldenby et al. |
| 2017/0048209 A1 | 2/2017 | Lohe et al. |
| 2017/0124483 A1 | 5/2017 | Huang |
| 2017/0149796 A1 | 5/2017 | Gvili |
| 2017/0154331 A1 | 6/2017 | Voorhees |
| 2017/0228822 A1 | 8/2017 | Creighton, IV et al. |
| 2017/0236123 A1 | 8/2017 | Ali et al. |
| 2017/0243241 A1 | 8/2017 | Boutelle et al. |
| 2017/0289111 A1 | 10/2017 | Voell et al. |
| 2017/0316479 A1 | 11/2017 | Kurian |
| 2017/0330179 A1 | 11/2017 | Song et al. |
| 2017/0364705 A1 | 12/2017 | Villars |
| 2017/0366357 A1 | 12/2017 | Pattanaik et al. |
| 2018/0041345 A1 | 2/2018 | Maim |
| 2018/0089644 A1 | 3/2018 | Chen et al. |
| 2018/0205555 A1 | 7/2018 | Watanabe et al. |
| 2018/0253702 A1 | 9/2018 | Dowding |
| 2018/0349894 A1 | 12/2018 | Patrinos et al. |
| 2018/0365688 A1 | 12/2018 | He et al. |
| 2018/0365691 A1 | 12/2018 | Sanders et al. |
| 2019/0005470 A1 | 1/2019 | Uhr et al. |
| 2019/0020629 A1 | 1/2019 | Baird, III et al. |
| 2019/0036712 A1 | 1/2019 | Qiu |
| 2019/0043043 A1 | 2/2019 | Saraniecki et al. |
| 2019/0044734 A1* | 2/2019 | Lancashire .......... G06Q 20/401 |
| 2019/0080392 A1 | 3/2019 | Youb et al. |
| 2019/0164153 A1* | 5/2019 | Agrawal ............. G06Q 20/065 |
| 2019/0182027 A1 | 6/2019 | Kipnis et al. |
| 2019/0228407 A1 | 7/2019 | Wu et al. |
| 2019/0236300 A1 | 8/2019 | Guo et al. |
| 2019/0280880 A1 | 9/2019 | Zhang et al. |
| 2019/0303621 A1* | 10/2019 | Baset .................. G06F 11/1662 |
| 2019/0349190 A1 | 11/2019 | Smith et al. |
| 2019/0358515 A1 | 11/2019 | Tran et al. |
| 2019/0386814 A1* | 12/2019 | Ahmed ................ H04L 9/3013 |
| 2019/0394019 A1 | 12/2019 | Gao |
| 2020/0028693 A1* | 1/2020 | Wu ........................ G06F 21/57 |
| 2020/0097958 A1* | 3/2020 | Imoto ................. G06Q 20/405 |
| 2020/0150994 A1* | 5/2020 | Thompson .......... G06F 9/45558 |
| 2020/0349563 A1 | 11/2020 | Lu et al. |
| 2021/0028939 A1 | 1/2021 | Trevethan |
| 2021/0081216 A1* | 3/2021 | Komarov .............. H04L 9/3239 |
| 2021/0203476 A1* | 7/2021 | van de Ruit .......... H04L 9/3236 |

FOREIGN PATENT DOCUMENTS

| | | |
|---|---|---|
| CN | 106982205 A | 7/2017 |
| CN | 107666388 A | 2/2018 |
| CN | 107679976 A | 2/2018 |
| CN | 108009441 A | 5/2018 |
| CN | 108021821 A | 5/2018 |
| CN | 108173805 A | 6/2018 |
| CN | 108335106 A | 7/2018 |
| CN | 108418689 A | 8/2018 |
| CN | 108711105 A | 10/2018 |
| CN | 108764874 A | 11/2018 |
| CN | 106549749 B | 12/2019 |
| KR | 20180024994 A | 3/2018 |
| KR | 20180036922 A | 4/2018 |
| TW | 201830302 A | 8/2018 |
| TW | I631518 B | 8/2018 |
| WO | 2017054985 A1 | 4/2017 |
| WO | 2017095833 A1 | 6/2017 |
| WO | 2017218983 A1 | 12/2017 |
| WO | 2018022132 A1 | 2/2018 |
| WO | 2018231397 A1 | 12/2018 |
| WO | 2019040855 A1 | 2/2019 |
| WO | 2019105407 A1 | 6/2019 |
| WO | WO-2020033296 A1 * | 2/2020 ......... G06Q 20/3676 |

OTHER PUBLICATIONS

Written Opinion for Singaporean Application No. 11201904629U dated Jul. 27, 2020.

Preinterview first office action for U.S. Appl. No. 16/878,236 dated Jul. 22, 2020.

Bunz et al. ("Bulletproofs: Short Proof for Confidential Transactions and More", 45 pages, Jul. 1, 2018) (Year: 2018).

Second Examination Report for Australian Application No. 2018349940 dated May 22, 2020.

Office Action for Canadian Application No. 3044907 dated Jun. 4, 2020.

Second Written Opinion for PCT Application No. PCT/US2019/045081 dated Mar. 18, 2020.

Written Opinion of the International Searching Authority and International Search Report for PCT Application No. PCT/CN2018/125749 dated Sep. 30, 2019 (6 pages).

Written Opinion of the International Searching Authority and International Search Report for PCT Application No. PCT/US2019/045081 dated Sep. 30, 2019 (16 pages).

Written Opinion of the International Searching Authority and International Search Report for PCT Application No. PCT/US2019/048667 dated Oct. 21, 2019 (13 pages).

Search Report for Taiwanese Application No. 108110705 dated Jan. 17, 2020.

Search Report for Taiwanese Application No. 108110708 dated Jan. 31, 2020.

Non-Final Office Action for U.S. Appl. No. 16/879,728 dated Feb. 2, 2021.

Non-Final Office Action for U.S. Appl. No. 16/531,476 dated May 10, 2021.

Non-Final Office Action for U.S. Appl. No. 16/879,728 dated May 24, 2021.

Wang et al., "Preserving transaction privacy in bitcoin, Future Generation Computer Systems," ScienceDirect, 2017.

Final Office Action for U.S. Appl. No. 16/878,236 dated Mar. 16, 2021.

Non-Final Office Action for U.S. Appl. No. 16/879,728 dated Dec. 9, 2021.

Notice of Allowance for U.S. Appl. No. 16/878,236 dated Dec. 20, 2021.

(56) References Cited

OTHER PUBLICATIONS

Kuribayashi et al., "Secure Data Management System with Traceability against Internal Leakage," https://ieeexplore.ieee.org/stamp/stamp.jsp?tp=&arnumber=8282268, Dec. 12-15, 2017.

* cited by examiner

500

```
Receive encrypted transactions
associated with a plurality of accounts,
a range proof for each of the
transactions, a sum proof on the
transactions, and a signature from each
of the plurality of accounts
502
```
↓
```
Validate the encrypted transactions, the
range proof for each of the transactions,
the sum proof on the transactions, and
the signature on the transactions
504
```
↓
```
Implement the transactions based on the
validation by updating a balance of the
each of the plurality of accounts
506
```

FIG. 5

SYSTEM AND METHOD FOR INFORMATION PROTECTION

CROSS REFERENCE TO RELATED APPLICATION

This application is a continuation application of U.S. patent application Ser. No. 16/464,061 filed on May 24, 2019, which is a national phase application of International Application No. PCT/CN2018/125749, filed with the China National Intellectual Property Administration on Dec. 29, 2018. The contents of all of the above-identified applications are incorporated by reference in the entirety.

TECHNICAL FIELD

This disclosure generally relates to computer technologies, and in particular, to systems and methods for information protection.

BACKGROUND

Privacy is important to communications and data transfers among various users. For example, information with respect to the sending party, receiving party, and transaction amount between the parties is an important part of privacy protection. Without protection, the users are exposed to the risk of identity theft, illegal transfer, or other potential losses. The risk becomes even greater when the communications and transfers are implemented online, because of the free access of online information.

SUMMARY

Various embodiments of the present disclosure can include systems, methods, and non-transitory computer readable media for information protection.

According to one aspect, a computer-implemented information protection method comprises: obtaining a plurality of encrypted transaction amounts associated with transactions among a plurality of accounts, wherein each of the encrypted transaction amounts is associated with one of the accounts that sends or receives one of the transaction amounts, and the encryption of each of the transaction amounts at least conceals whether the one account sends or receives the one of the transaction amounts; generating a sum proof based on the obtained encrypted transaction amounts, the sum proof at least indicating that the transaction amounts are balanced; and transmitting the encrypted transaction amounts and the sum proof to one or more nodes on a blockchain network for the nodes to verify the transactions.

In some embodiments, the encryption of each of the transaction amounts at least conceals whether the one account sends or receives the one of the transaction amounts by hiding whether each of the transaction amounts is inbound or outbound to the one account.

In some embodiments, before generating the sum proof, the method further comprises: obtaining a plurality of range proofs respectively for the accounts involved in the transactions, the range proofs at least indicating that each of the accounts that sends the transaction amounts has sufficient asset.

In some embodiments, before transmitting the encrypted transaction amounts and the sum proof to the one or more nodes, the method further comprises: obtaining a plurality of signatures respectively from the accounts. Transmitting the encrypted transaction amounts and the sum proof to the one or more nodes on the blockchain network for the nodes to verify the transactions comprises transmitting the encrypted transaction amounts, the range proofs, the sum proof, and the signatures to the one or more nodes on the blockchain network for the nodes to verify the transactions based on the encrypted transaction amounts, the range proofs, the sum proof, and the signatures.

In some embodiments, transmitting the encrypted transaction amounts, the range proofs, the sum proof, and the signatures to the one or more nodes on the blockchain network for the nodes to verify the transactions based on the encrypted transaction amounts, the range proofs, the sum proof, and the signatures comprises: transmitting the encrypted transaction amounts, the range proofs, the sum proof, and the signatures to the one or more nodes on the blockchain network; and causing the nodes to: validate the encrypted transaction amounts, the range proofs, the sum proof, and the signatures, execute the transactions in response to successfully verifying the transactions, and add the transactions into a new data block of a blockchain maintained by the blockchain network.

In some embodiments, causing the nodes to execute the transactions in response to successfully verifying the transactions comprises: causing the nodes to deduct the encrypted transaction amounts correspondingly from encrypted account balances of the accounts in response to successfully verifying the transactions.

In some embodiments, the encryption of each of the transaction amounts comprises a homomorphic encryption.

In some embodiments, the encryption of each of the transaction amounts comprises a Pedersen Commitment scheme.

According to another aspect, an information protection system comprises one or more processors and one or more non-transitory computer-readable memories coupled to the one or more processors and configured with instructions executable by the one or more processors to cause the system to perform operations comprising: obtaining a plurality of encrypted transaction amounts associated with transactions among a plurality of accounts, wherein each of the encrypted transaction amounts is associated with one of the accounts that sends or receives one of the transaction amounts, and the encryption of each of the transaction amounts at least conceals whether the one account sends or receives the one of the transaction amounts; generating a sum proof based on the obtained encrypted transaction amounts, the sum proof at least indicating that the transaction amounts are balanced; and transmitting the encrypted transaction amounts and the sum proof to one or more nodes on a blockchain network for the nodes to verify the transactions.

According to another aspect, a non-transitory computer-readable storage medium is configured with instructions executable by one or more processors to cause the one or more processors to perform operations comprising: obtaining a plurality of encrypted transaction amounts associated with transactions among a plurality of accounts, wherein each of the encrypted transaction amounts is associated with one of the accounts that sends or receives one of the transaction amounts, and the encryption of each of the transaction amounts at least conceals whether the one account sends or receives the one of the transaction amounts; generating a sum proof based on the obtained encrypted transaction amounts, the sum proof at least indicating that the transaction amounts are balanced; and transmitting the encrypted transaction amounts and the sum proof to one or more nodes on a blockchain network for the nodes to verify the transactions.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 5 illustrates a flowchart of another exemplary method for information protection, in accordance with various embodiments.

DETAILED DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments consistent with the present invention do not represent all implementations consistent with the invention. Instead, they are merely examples of systems and methods consistent with aspects related to the invention.

The blockchain technology may be built on a point-to-point (peer) network, using distributed node consensus algorithm to validate and update data. The blockchain may also use cryptography to ensure the security of data transmission and access, and use smart contracts including automated scripting code to program and manipulate data. A blockchain may include a series of data blocks each including a header that links to the previous data block, thus forming a chain of data blocks. To establish the link, the header of a current data block may include a cryptographic hash or checksum of the previous data block's header. A blockchain network may facilitate execution of transactions. A transaction refers to any communication between users (user nodes such as their computing devices) or between a user and a financial entity. For example, a transaction may refer to a purchase or sale of goods or services, an offer or a return of goods or services, a payment transaction, a credit transaction, or other like interactions. A transaction may also be referred to as a "trade" or a "trading." The subject matter of the transaction may comprise, for example, money, token, digital currency, contract, deed, medical record, customer detail, stock, bond, equity, or any other asset that can be described in digital form.

Blockchain can be considered as a tamper-proof, shared, and digital ledger that records transactions in a public or private peer network. The ledger is distributed to member nodes in the network, and a history of asset transactions occurring in the network is recorded in the blockchain. Since the blockchain ledger is public and the ledger itself has no privacy protection function, important transaction information in the ledger is exposed to the public and under the risk of unauthorized or malicious use. For example, in existing blockchain transaction frameworks, transactions need to explicitly indicate which party is to send an asset, which party is to receive the asset, and the transaction asset amount, none of which is protected. To at least mitigate the deficiencies in the existing technologies and improve the information protection functionality of computers, systems and methods for information protection are disclosed with reference to FIG. 1 to FIG. 7.

Figure 1:
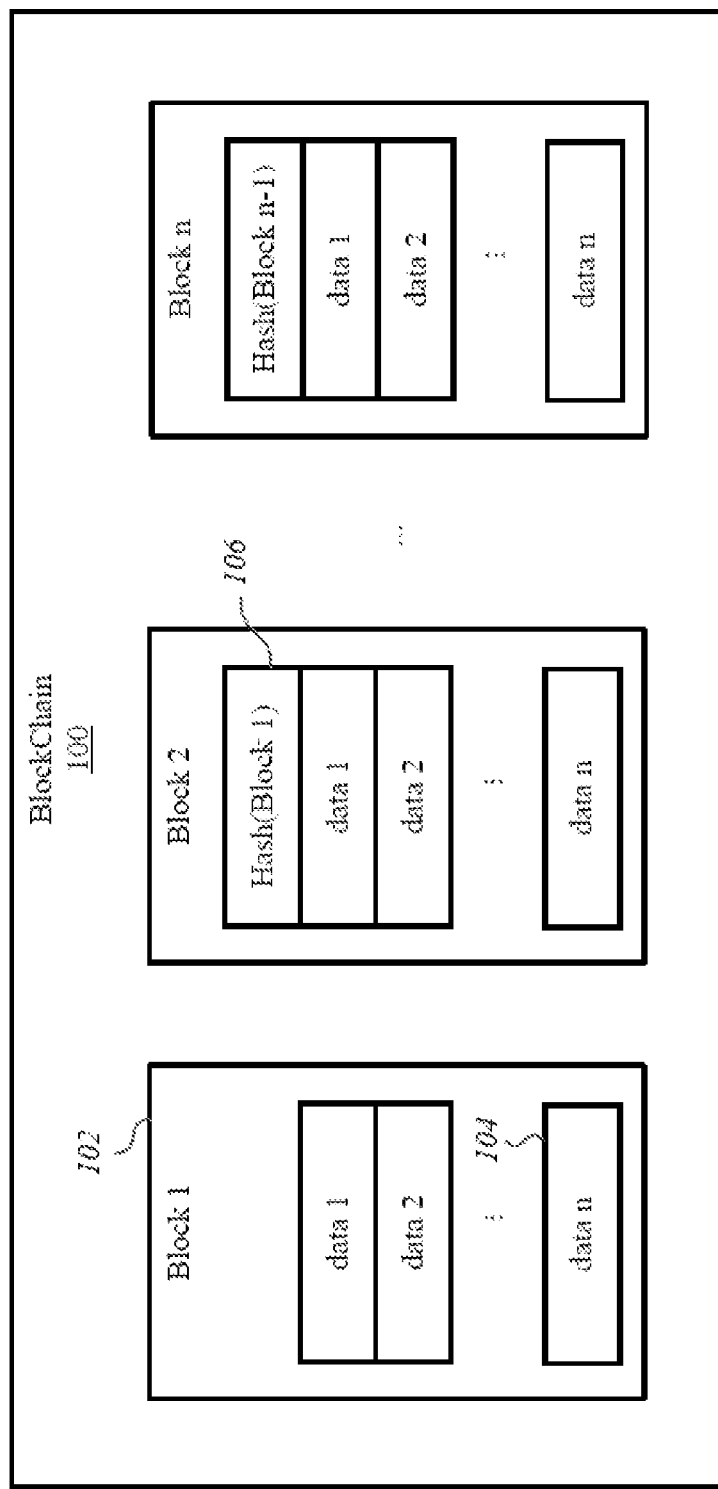
FIG. 1 illustrates an exemplary blockchain, in accordance with various embodiments.

FIG. 1 illustrates an exemplary blockchain, in accordance with various embodiments. As shown in FIG. 1, a blockchain 100 may include a plurality of data blocks 102. Each block 102 is a data structure that includes data 104 including, for example, transactions, payment receipts, etc. Each block may link to the previous block via a cryptographic hash. For example, block 2 is linked to block 1 via a hash 106 of block 1, block n is linked to block n−1 via another hash of block n−1. As new data is submitted and validated, additional blocks including the new data may be generated and appended to the last block of the blockchain 100 by including the hash of the previous block.

Figure 2:
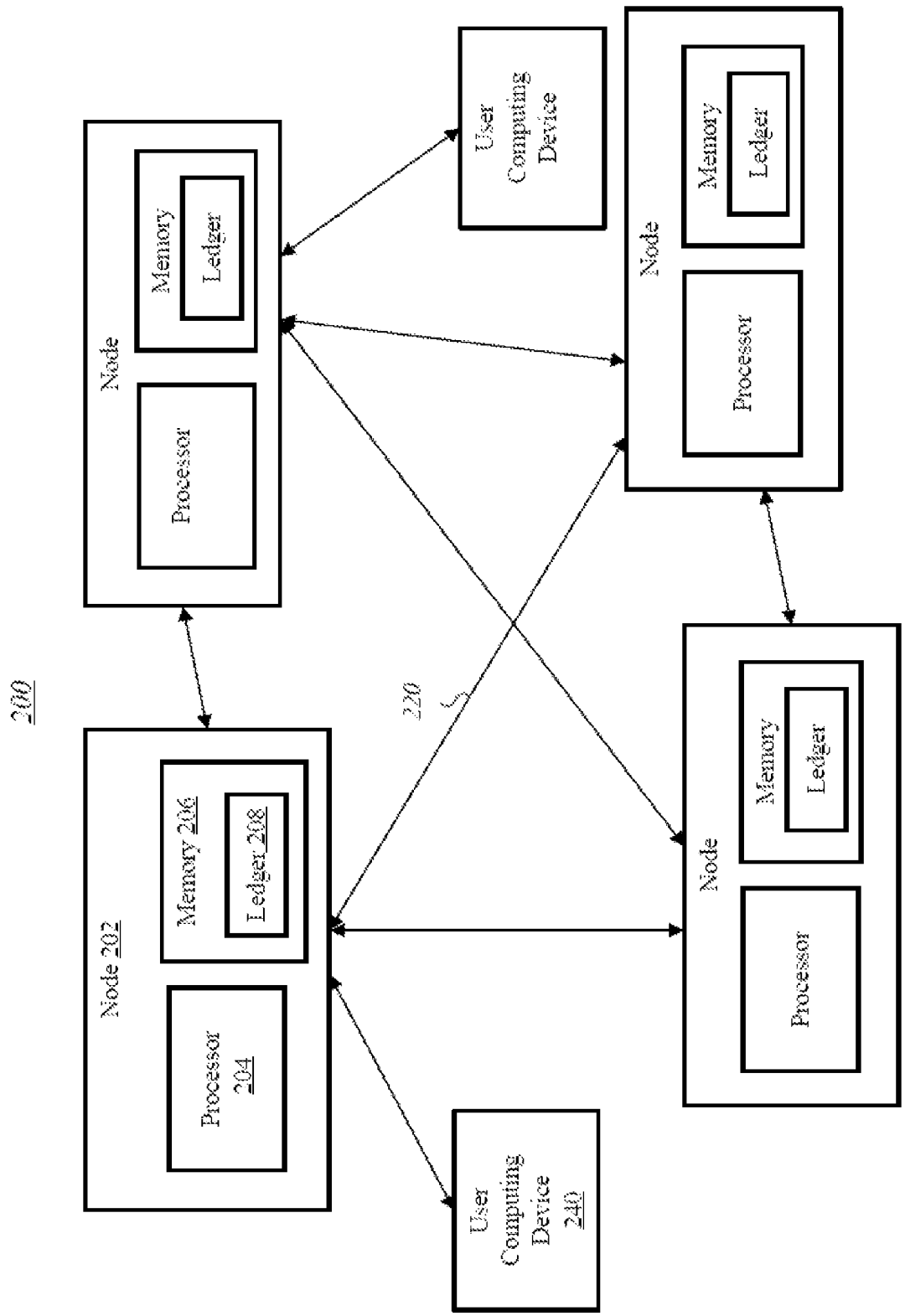
FIG. 2 illustrates an exemplary blockchain network for information protection, in accordance with various embodiments.

FIG. 2 illustrates an exemplary blockchain network 200 for executing transactions, in accordance with various embodiments. As shown in FIG. 2, the blockchain network 200 may include a plurality of nodes 202 and one or more user computing devices 240, which may be communicative between each other through one or more communication pathways. An exemplary communication pathway is a network 220 (e.g., wired or wireless connections, over the internet, etc.) that uses one or more communication protocols, for example, cellular, WiFi, and other communication protocols, to transmit and receive data. The network 220 may be based on a peer-to-peer and/or a client/server model. In some embodiments, the plurality of nodes 202 may comprise computing devices each including one or more processors 204 and one or more memories 206 (e.g., one or more non-transitory computer-readable storage media storing instructions) coupled to the one or more processors 204. The node 202 may be an exemplary system for improving security of smart contract. The one or more memories may be configured with instructions executable by the one or more processors to cause the system (e.g., the one or more processors) to perform operations described herein. In some embodiments, the processor 204 may be implemented partially or entirely as one or more logic circuits. In some embodiments, the nodes 202 and the user computing devices 240 may include other computing resources and/or have access (e.g., via one or more connections/networks) to other computing resources.

In some embodiments, the blockchain 100 is stored in a decentralized manner on the plurality of nodes 202. In some embodiments, some of the nodes 202 may validate transactions which they have received through consensus and propagate the validated transactions to the other nodes 202. Accordingly, the nodes 202 may update the ledger 208 according to the validated transactions. The nodes 202 may communicate with one another via the network 220 to transmit and receive data related to the ledger 208. The ledger 208 includes the data blocks 102 that have been validated and added to the blockchain 100. As new data blocks are added to the ledger 208, the nodes 202 may communicate or share the new data blocks via the network 220. The memory 206 of the nodes 202 may store at least a portion of the ledger 208 of the blockchain 100.

In some embodiments, one or more users may submit transactions to the one or more nodes 202 through the user computing devices 240 via the communication pathways 220. In some embodiments, the submitted transactions may be stored temporarily in a pool residing across the memory 206 in the nodes 202 or in a remote database accessible through the network 220. One or more of the nodes 202 may retrieve the submitted transactions from the pool and process the submitted transactions. For conciseness and simplicity, the present disclosure may use the singular form of the node 202. A person having ordinary skill in the art should appreciate that the blockchain network may have multiple nodes 202 and one or more nodes 202 may be involved in processing one transaction. The singular form of node 202 may represent one or more nodes.

In some embodiments, the node 202 may update the blockchain 100 based on outcomes of the transactions. In some embodiments, a transaction may involve two or more participants (also referred to as parties or users such as a sender and a receiver). The transaction may be an agreement between the two parties for exchanging asset(s). For example, a transaction may include one party's transferring or paying an amount of asset to the other party, and the amount of the payment may be agreed upon by both parties. The asset may be of the form of digital currency, e.g., Bitcoin, Monero, etc. Alternatively, the asset may be a conventional currency, such as dollars. The parties of the transactions may be associated with accounts respectively. Each account of the parties may have an address and a balance stored in the blockchain 100. Thus, after the transaction is executed, the node 202 may update the balance of each account of the parties.

In some embodiments, the node 202 may execute the transaction without the knowledge of which party is a sender that sends or pays the asset and which party is a receiver that receives the asset. The disclosed systems and methods may hide the information regarding which party is a sender and which party is a receiver but still allow the blockchain transaction to be processed. In some embodiments, the amount of asset to be transacted may be labeled with positive or negative to indicate whether the party associated with the amount of asset is a sender or a receiver. For example, in a transaction between party A and party B, an amount of $1,000 (positive) for A indicates that party A sends $1,000 to party B, while an amount of −$1,000 (negative) for A indicates that party A receives $1,000 from party B. Therefore, if the transaction amount of an account A is larger than zero, the account A is to pay or send out the transaction amount to another account B, and thus this account A is a sender. In contrast, if the transaction amount of an account A is less than zero (negative), then the account A is to receive the amount, and the account A is a receiver.

In some embodiments, the transaction amount may be encrypted through various encryption methods. In one example the transaction amount may be encrypted through a homomorphic encryption. The homomorphic encryption scheme may include, but not be limited to, Elgamal homomorphic encryption, Paillier homomorphic encryption, Benaloh homomorphic encryption Okamoto-Uchiyama homomorphic encryption, Naccache-Stern homomorphic encryption, Damgård-Jurik homomorphic encryption, Boneh-Goh-Nissim homomorphic encryption, etc. In another example, the transaction amount may be encrypted through a commitment scheme such as a homomorphic commitment. For example, the homomorphic commitment may be a Pedersen Commitment. The Pedersen Commitment "T" of a transaction amount "t" may be represented as follows.

$$T=PC(r,t)=rG+tH,$$

where r is a random blinding factor (alternatively referred to as binding factor) that provides hiding, G and H are the publicly agreed generators or basepoints of the elliptic curve and may be chosen randomly. For example, r may be a random number. G and H may be known parameters to node 202. A commitment scheme maintains data secrecy but commits to the data so that it cannot be changed later by the sender of the data. A party that receives the commitment (e.g., a receiver node of a transaction) only knows the commitment value (e.g., PC(r, t)), the party cannot determine what underlying data value (e.g., t) has been committed to because of the presence of the random blinding factor (e.g., r). However, the node 202 receiving the commitment can run the commitment and verify that the committed data matches the revealed data. In this way, through hiding the roles (e.g., a sender, or a receiver) of the parties as well as by encrypting the transaction amount, a third-party entity will not know which party is a sender and which party is a receiver, thereby protecting the privacy of the parties in the transaction.

Pedersen Commitment has an additional property: commitments can be added, and the sum of a set of commitments is the same as a commitment to the sum of the data (with a blinding key set as the sum of the blinding keys): $PC(r_1, t_1)+PC(r_2, t_2)=PC(r_1+r_2, t_1+t_2)$. In other words, the commitment preserves addition and the commutative property applies, i.e., the Pedersen Commitment is additively homomorphic, in that the underlying data may be manipulated mathematically as if it is not encrypted. Therefore, when applying Pedersen Commitment to the transaction amount and a balance of the party of the transaction, the balance may be updated using the transaction amount by directly adding the Pedersen Commitments, without decrypting the Pedersen Commitments of the transaction amount and/or the balance.

In some embodiments, the node 202 may execute multiple transactions like the one described above in batch. For example, besides the transactions between party A and party B, party C and party D may also request transactions between them. Further, party E and party F may also request to transfer asset between each other. The transactions between party A and party B may be mixed with the transactions between party C and party D and between party E and party F. The node 202 may execute the transactions among the parties A, B, C, D, E, and F at one time without requiring expressed indication of respective senders and receivers. In a more complicated situation, the node 202 may execute multiple transactions in which one party (e.g., party A) is to send different transaction amounts of asset to different parties (e.g., party B, party C, etc.).

Figure 3:
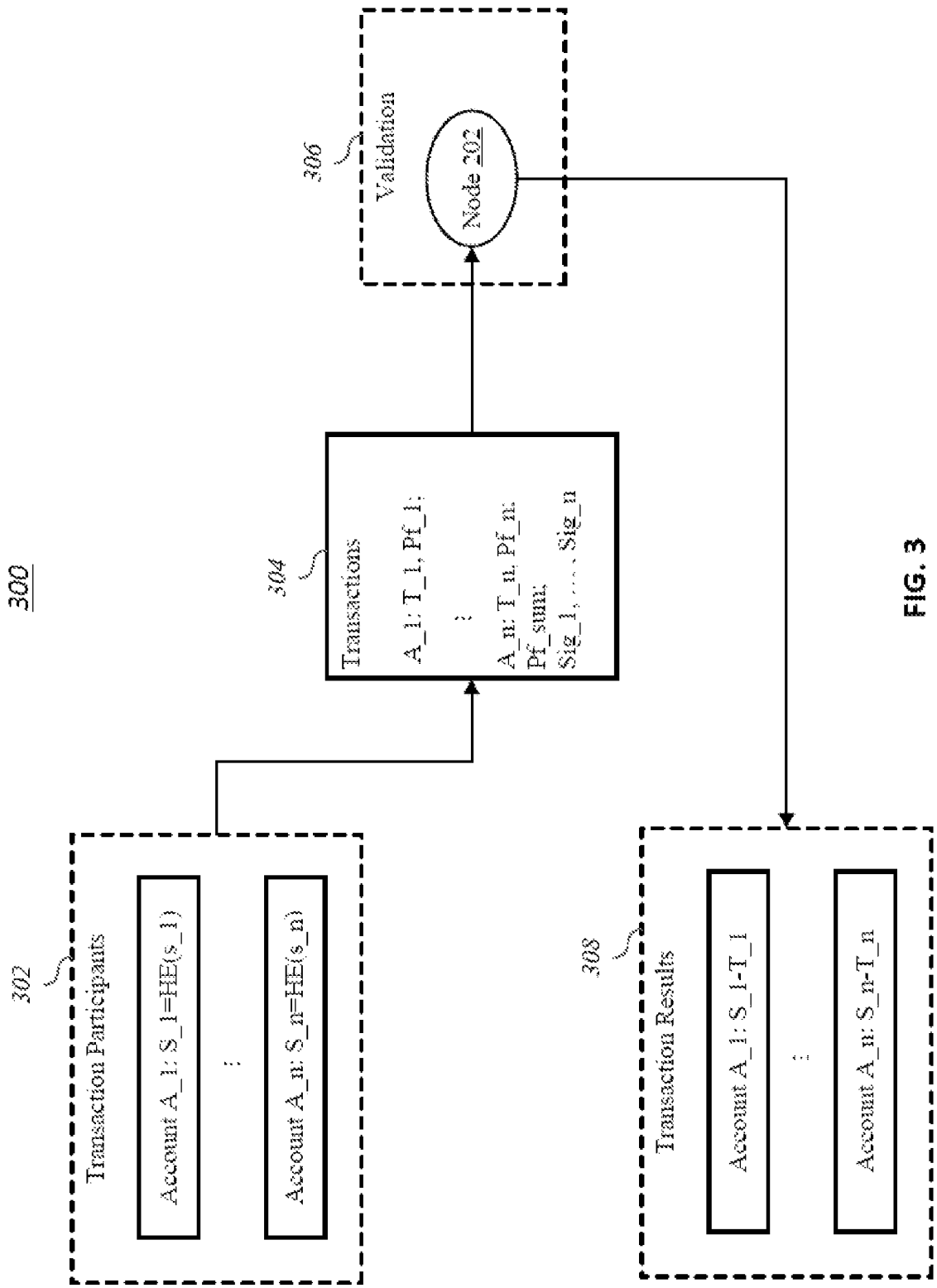
FIG. 3 illustrates an exemplary transaction execution flow with mixed senders and receivers, in accordance with various embodiments.

Referring to FIG. 3, an exemplary transaction execution flow 300 with mixed senders and receivers is illustrated in accordance with various embodiments. The transaction execution flow 300 may be implemented in various systems including, for example, the blockchain network 200 of FIG. 2. The transaction execution flow 300 may be implemented by one or more of the nodes 202 and the user computing devices 240. The operations of the transaction execution flow 300 presented below are intended to be illustrative. Depending on the implementation, the exemplary transaction execution flow 300 may include additional, fewer, or alternative steps performed in various orders or in parallel.

In the illustrated embodiments of FIG. 3, participants of one or more transactions and their associated accounts are shown in block 302. For example, each of the participants may be associated with an account "Account A_i," where $1 \leq i \leq n$, and n may be any positive integer. In some embodiments, n may indicate the total number of participants. In other embodiments, i may not be continuous integers, and thus n may not indicate the total number of participants. As shown at block 302, each of the accounts "Account A_i" may include a balance "s_i," which may be the amount of asset in the available account "Account A_i." In some embodiments, the balance "s_1" may be of the form of digital currency, e.g., Bitcoin, etc. Alternatively, the balance "s_1" may represent conventional currency. Further, as shown at block 302, the balance "s_i" may be encrypted to obtain an encrypted balance "S_i" through one or more homomorphic encryption or homomorphic commitment schemes as described above. The encrypted balance "S_i" may be a ciphertext of the balance "s_i" and referred to as "HE(s_i)." Therefore, S_i=HE(s_i), where $1 \leq i \leq n$, and n may be any positive integer. For example, the account "Account A_1" includes a ciphertext of its balance "s_1" represented by "S_1," where S_1=HE(s_1). In some embodiments, the encrypted balance "S_i" is a Pedersen Commitment, and HE(s_i)=r_i*G+s_i*H, where r is a random blinding factor.

At block 304, multiple transactions from a plurality of accounts "Account A_i" of the participants may be received by node 202. In the illustrated embodiments of FIG. 3, each account may be associated with an account identification (ID) such as "A_i," a transaction amount "t_i," a range proof "Pf_i," and a signature "Sig_i." A "signature" shows approval from a real identity. The term "signature" can be any form of indication of approval. For example, a signature associated with a transaction from an account shows that the account approves the transaction. In some embodiments, the transactions may be encrypted to conceal at least the identity of a sender or receiver of each of the transactions. For example, the transactions may include a ciphertext of the actual transaction amount of each transactions, represented as "T_i," where T_i=HE(t_i). The ciphertext of the transaction amount may be generated through the above described homomorphic encryption or homomorphic commitment schemes. For example, the encrypted transaction amount "T_i" may be a Pedersen Commitment of the actual transaction amount "t_i."

The range proof may be a secure proof protocol which is used to prove that a number is within a range, while not revealing other information of the number, such as the actual value of the number. For example, the range proof may be generated through schemes including, e.g., Borromean ring signature scheme, bulletproof scheme, etc. Other schemes may also be used to generate the range proof. The range proof "Pf_i" can show that the account "A_i" has sufficient balance to enable the transaction, e.g., the balance of the account "s_i" being larger than or equal to the absolute value of the transaction amount "t_i." The range proof "Pf_i" of the account "A_i" may be represented by $Pf\_i = Pf(s_i - t_i \geq 0)$.

In some embodiments, another proof, e.g., Pf_sum=Pf (t_1+t_2+ . . . +t_n=0), may be generated upon the transactions. This proof may be referred to as a sum proof hereinafter, which is used to show that the sum of the transaction amounts is balanced, e.g., zero. As described above, a sender's transaction amount may be indicated as a positive value, while that of the corresponding receiver may be indicated as a negative value. The absolute values of the transaction amounts associated with the sender and corresponding receiver are the same. In this way, the node 202 may execute the transaction between the sender and receiver without requiring expressed indication of which party is the sender and which party is the receiver.

In the example described above where party A is to pay $1,000 to party B, assuming that party A is associated with an account ID "A_1" while party B is associated with an account ID "A_2," the transaction amount "t_1" associated with "A_1" is +$1,000, while the transaction amount "t_2" associated with "A_2" is −$1,000. A sum proof "Pf_sum" may be generated to show that the transaction amount "t_1" and transaction amount "t_2" offset each other, and the sum of the transaction amounts "t_1" and "t_2" is zero.

In some embodiments, the sum proof "Pf_sum" may be proven based on the encrypted transaction amount $HE(t_1)$. For example, the ciphertext of the transaction amount HE(t_i) may be represented by $HE(t\_i)=G^{\{t\_i\}}*H^{\{r\_i\}}$ where r_i is a random blinding factor, G and H are the publicly agreed generators or basepoints of the elliptic curve and may be chosen randomly. Therefore, the sum proof "Pf_sum" may be P f (r=r_1+r_2+ . . . +r_n). When validating the sum proof, a node 202 may verify whether HE(t_1)* . . . *HE(t_n)=H$^r$. If HE(t_1)* . . . *HE(t_n)=H$^r$, it shows that t_1+t_2+ . . . +t_n=0, thus proving Pf_sum and the transaction amounts are balanced. Otherwise, the transaction amounts are not balanced, and there may be any incorrect transaction amount. In some embodiments, the transaction amounts may be encrypted using other schemes, and thus the sum proof and the verification of the sum proof may be different from those described herein.

When there are multiple senders and/or receivers, the transaction amounts between each couple are balanced out. In some embodiments, when a sender is to transact with multiple receivers, the transaction amount of the sender may be set as the sum of all the transaction amounts to be sent to the multiple receivers. For example, when the account "A_1" is to send a transaction amount of $1,000 to the account "A_2" and a transaction amount of $2,000 to the account "A_3," the transaction amount of the account "A_1" is $3,000 (e.g., the sum of $1,000 and $2,000). The transaction amount of the account "A_1" is balanced out by the transaction amount of the account "A_2," i.e., −$1,000, and the transaction amount of the account "A_3," i.e., −$2,000. Similarly, other transaction amounts in the transactions are balanced. Such a proof may be generated and associated with the transactions.

As described above, a signature from each account may be received, and the signature is represented by "Sig_i" in FIG. 3. In some embodiments, the signature may be signed by each account on the transactions, range proof, and sum proof, represented by Sig_i=Signature (A_1: T_1, Pf_1; . . . ; A_n: T_n, Pf_n; Pf_sum). This way, the each account involved in the transaction(s) has expressed its agreement to the various parameters in Signature ( ). In some embodiments, the signature may be associated with one or more of the transactions, range proofs, or the sum proof.

At block 306, a node 202 may receive the transactions associated with the above described multiple accounts, range proofs, a sum proof, and signatures associated with at least one of the transaction(s), range proof, or sum proof, for verifying the received transactions. In some embodiments, the node 202 may receive the transactions from an organizer node which coordinates between the transaction participants. In some embodiments, the organizer node may be a third-party entity implemented by a computing device (not shown but similar to node 202). For example, each participant may send, through a user computing device 240, its account ID along with an encrypted transaction amount, a range proof, and the like to the organizer node. The organizer node may generate a sum proof based on the received transaction amounts from the participants. The organizer node may submit the transactions associated with a plurality of accounts, a range proof for each of the transactions, a sum proof on the transactions, and a signature from each of the plurality of accounts associated with at least one of the transactions, range proofs, or the sum proof to the block-chain network 200 including the nodes 202. In some embodiments, the organizer node may be one of the participants coordinating the other participants. Alternatively, the organizer may be a node 202 of the blockchain network 200. The organizer node 202 may receive the transactions associated with multiple account IDs, along with a range proof for each of the transactions, a signature associated with at least one of the transactions, range proofs, or the sum proof, from the participants. The organizer node 202 may perform the sum proof based on the received transaction amounts from the participants.

At block 306, the node 202 may validate the transactions, the range proofs, the sum proof, and the signatures. In response to the transactions and associated information's being validated, the node 202 may implement the transactions by updating the balance of each account involved in the transactions. For example, the node 202 may verify each account's signature. In some embodiments, if any of the signatures is invalid, the node 202 may reject the transactions. After each of the signature's is verified, the node 202 may validate the each range proof for each of the transactions. In some embodiments, the node 202 may retrieve the encrypted balance "S_i" and check the range proof "Pf_i" against the encrypted balance "S_i." In some embodiments, the node 202 may verify the validity of the range proof "Pf_i" itself. In response to any of the range proofs' being invalid, the node 202 may reject the transactions.

In some embodiments, after the each range proof is validated, the node 202 may validate the sum proof on the transactions. For example, if the sum proof is generated upon the encrypted transaction amounts, the node 202 may verify the sum proof according to the encryption scheme, as described above with reference to block 304. In response to the sum proof' being invalid, the node 202 may reject the transactions. In some embodiments, after the sum proof's is validated, the node 202 may update the balance of the each account. For example, the node 202 may update the balance "s_i" by subtracting the transaction amount "t_i" from the balance "s_i," i.e., s_i-t_i. In the above example where the account "A_1" is to send a transaction amount of $1,000 to the account "A_2," if the node 202 has validated the transactions, then the node 202 may subtract $1,000 from the balance "S_1" of the account "A_1," and add $1,000 to the balance "S_2" of the account "A_2." In some embodiments, the node 202 may directly update the encrypted balance, as represented by S_i-T_i. As described above, the Pedersen Commitment is additively homomorphic, and the underlying data may be manipulated mathematically as if it is not encrypted. For example, the node 202 may update the Pedersen Commitment of the balance by adding the Pedersen Commitment of the transaction amount to the Pedersen Commitment of the balance. At block 308, transaction results may be obtained. As illustrated in FIG. 3, after the execution of the transactions, the balance of each account has been updated as "S_i-T_i."

The above description describes the validations of the signatures, the range proofs, and the sum proof in a chronological order. A person having ordinary skill should appreciate that the validations can have any order. For example, the node can validate in the order of signature, sum proof, range proof, or range proof, sum proof, signature, or range proof, signature, sum proof, or sum proof, range proof, signature, or sum proof, signature, range proof. In addition, the validations are optional. Some of the validations, for example, range proof and/or signature may be omitted.

As such, the present disclosure enables simultaneous execution of multiple transactions among mixed senders and receivers with enhanced privacy protection. That is, the sender and receiver identities are hidden from the public. A transaction amount of each participant can be greater or less than zero. A positive transaction amount indicates that the participant's account is to expend this amount, while a negative transaction amount indicates that the account is to receive this amount. In addition, the present disclosure may also use homomorphic encryption, homomorphic commitment, or other encryption schemes to encrypt the transaction amount and the balance of each account in the transaction, thus making it impossible for a non-participant to know whether the transaction amount is positive or negative or the actual number of the transaction amount or the balance, thereby preventing the non-participant from identifying who is the sender and who is the recipient.

Figure 4:
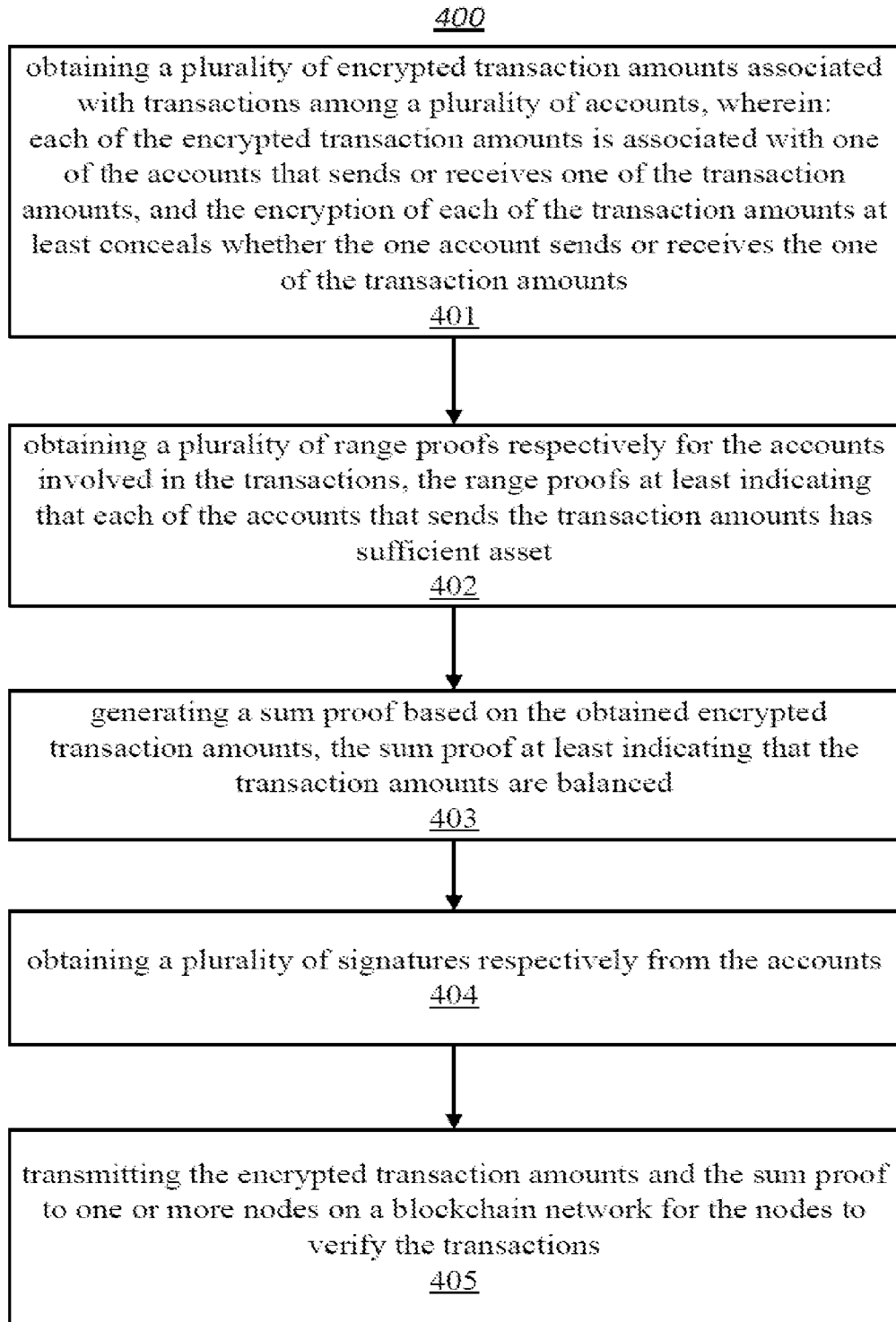
FIG. 4 illustrates a flowchart of an exemplary method for information protection, in accordance with various embodiments.

FIG. 4 illustrates a flowchart of an exemplary method 400 for transaction execution, in accordance with various embodiments. The method 400 may be implemented in various systems including, for example, one or more components of the blockchain network 200 of FIG. 2. The exemplary method 400 may be implemented by one or more of the nodes 202 and/or the user computing devices 240. In one example, the method 400 may be implemented by an organizer node (e.g., one of the nodes 202). In another example, the method 400 may be implemented by one or more nodes (e.g., the nodes 202) performing the transactions. The operations of the method 400 presented below are intended to be illustrative. Depending on the implementation, the exemplary method 400 may include additional, fewer, or alternative steps performed in various orders or in parallel.

Block 401 comprises obtaining a plurality of encrypted transaction amounts (e.g., HE(t_1), HE(t_2), . . . , HE(t_n)) associated with transactions among a plurality of accounts (e.g., A_1, A_2, . . . A_n), wherein each of the encrypted transaction amounts is associated with one of the accounts that sends or receives one of the transaction amounts, and the encryption of each of the transaction amounts at least conceals whether the one account sends or receives the one of the transaction amounts.

In some embodiments, the encryption may be performed by the organizing node or by nodes acting as senders or receivers of the transactions and received by the organizing node. Various encryption methods may be used to encrypt the transaction amounts. The encryption of each of the transaction amounts comprises a homomorphic encryption. For example, the encryption of each of the transaction amounts may be a homomorphic encryption or a homomorphic commitment scheme (e.g., a Pedersen Commitment scheme).

In some embodiments, an asset transfer between two or more accounts may be decoupled into a plurality of transactions each associated with either a sender account or a receiver account. Each account may be associated with a node of the nodes 202. For example, an asset transfer of $100 from account A to B may comprise a first transaction of +$100 associated with account A indicating that account A expends $100 and comprise a second transaction of −$100 associated with account B indicating that account B receives $100. For another example, an asset transfer of $100 from account A to B and another asset transfer of $80 from account A to C may comprise a first transaction of +$180 associated with account A indicating that account A expends $180, comprise a second transaction of −$100 associated with account B indicating that account B receives $100, comprise a third transaction of +$80 associated with account A indicating that account A expends $80, and comprise a third transaction of −$80 associated with account C indicating that account C receives $80. The "+" and "−" signs may be reversed or changed to any other alternative representation. Also, as shown, two of the accounts may be the same, for example, when an account expends to or receives from multiple accounts.

Further, in some embodiments, the encryption of each of the transaction amounts at least conceals whether the one account sends or receives the one of the transaction amounts by hiding whether each of the transaction amounts is inbound (e.g., receiving asset) or outbound (e.g., sending out asset) to the one account. In the example of an asset transfer of $100 from account A to B and of $80 from account A to C, by the encryption, information indicating a sender or receiver identity such as the "+" in the transaction amount "+$180" and the "−" in the transaction amounts "−$100" and "−$80" may be removed. That is, the encrypted transaction amounts will not contain information that indicates a sender or receiver identity. Even if the encrypted transaction amounts may (but not necessarily) comprise a "+" or "−" sign, the sign can no longer correctly indicate the sender or receiver identity. Thus, the sender and receiver identities in the transactions are protected from the public.

Optional block 402 comprises: obtaining a plurality of range proofs (e.g., Pf_1, Pf_2, ..., Pf_n) respectively for the accounts involved in the transactions, the range proofs at least indicating that each of the accounts that sends the transaction amounts has sufficient asset. Details can be referred to the Pf_i described above.

Block 403 comprises: generating a sum proof (e.g., Pf_sum) based on the obtained encrypted transaction amounts, the sum proof at least indicating that the transaction amounts are balanced. Details can be referred to the Pf_sum described above. For example, the organizer node may obtain the encrypted transaction amounts and determine if $HE(t\_1)^* \ldots *HE(t\_n)=H^{r\_1}*H^{r\_2}* \ldots *H^{r\_n}=H^r$. If $HE(t\_1)^* \ldots *HE(t\_n)=H^r$, it shows that $t\_1+ t\_2+ \ldots +t\_n=0$, thus the organizing node verifies that the transaction amounts are balanced. Otherwise, the transaction amounts are not balanced, and the organizing node may reject the transactions. With the encryption and the homomorphic property of the encryption, the organizing node may perform such verification even without knowing the underlying transactions amounts and whether they are inbound or outbound.

Optional block 404 comprises obtaining a plurality of signatures (e.g., Sig_1, Sig_2, ..., Sig_n) respectively for the accounts. The signatures are associated with at least one of the encrypted transaction amounts, the range proofs, and the sum proof. Details can be referred to the Sig_i described above. The signing may follow Digital Signature Algorithm (DSA) such as Elliptic Curve Digital Signature Algorithm (ECDSA), whereby the receiver (e.g., nodes that validate the transactions) of the signature can verify the signature with the signatory's (e.g., nodes that participate in the transactions) public key to authenticate the signed data.

Block 405 comprises transmitting the encrypted transaction amounts and the sum proof to one or more nodes (e.g., consensus nodes) on a blockchain network for the nodes to verify the transactions. In some embodiments, transmitting the encrypted transaction amounts and the sum proof to the one or more nodes on the blockchain network for the nodes to verify the transactions comprises transmitting the encrypted transaction amounts, the range proofs, the sum proof, and the signatures to the one or more nodes on the blockchain network for the nodes to verify the transactions based on the encrypted transaction amounts, the range proofs, the sum proof, and the signatures.

In some embodiments, transmitting the encrypted transaction amounts, the range proofs, the sum proof, and the signatures to the one or more nodes on the blockchain network for the nodes to verify the transactions based on the encrypted transaction amounts, the range proofs, the sum proof, and the signatures comprises: transmitting the encrypted transaction amounts, the range proofs, the sum proof, and the signatures to the one or more nodes on the blockchain network; and causing the nodes to: validate the encrypted transaction amounts, the range proofs, the sum proof, and the signatures, execute the transactions in response to successfully verifying the transactions, and add the transactions into a new data block of a blockchain maintained by the blockchain network. With the encryption and the homomorphic property of the encryption, the nodes may perform such validation even without knowing the underlying transactions amounts and whether they are inbound or outbound.

In some embodiments, causing the nodes to execute the transactions in response to successfully verifying the transactions comprises: causing the nodes to deduct the encrypted transaction amounts (T_i) correspondingly from encrypted account balances (e.g., S_i of the accounts in response to successfully verifying the transactions. Due to the homomorphic property, (S_i−T_i) can update the balances according to the transactions while keeping the balances encrypted.

As such, the disclosed systems and methods allow transactions to be executed between participating accounts without disclosing which account is a sender and which account is a receiver. While the underlying transaction amount can be greater or less than zero to indicate a sender and a receiver, tailored encryption can be used to conceal the transaction amounts such that the transaction amounts cannot be used to indicate a sender or a receiver by a non-participant. Further, the participating accounts in multiple transactions may be mixed together in any order, without indicating whether they are to send or to receive assets. And the multiple transactions or asset transfers can be executed in batch. In this way, privacy protection of the participating accounts is achieved, which improves the functionality of computers and makes online transactions safer.

FIG. 5 illustrates a flowchart of another exemplary method 500 for transaction execution, in accordance with various embodiments. The method 500 may be implemented in various systems including, for example, one or more components of the blockchain network 200 of FIG. 2. The exemplary method 500 may be implemented by one or more of the nodes 202 and/or the user computing devices 240. The operations of the method 500 presented below are intended to be illustrative. Depending on the implementation, the exemplary method 500 may include additional, fewer, or alternative steps performed in various orders or in parallel.

At block 502, encrypted transactions associated with a plurality of accounts, a range proof for each of the transactions, a sum proof on the transactions, and a signature from each of the plurality of accounts associated with at least one of the transactions, range proofs, or the sum proof may be received. At block 504, the encrypted transactions, the range proof for each of the transactions, the sum proof on the transactions, and the signature from each of the plurality of accounts may be validated. At block 506, the transactions may be implemented based on the validation by updating a balance of the each of the plurality of accounts.

Figure 6:
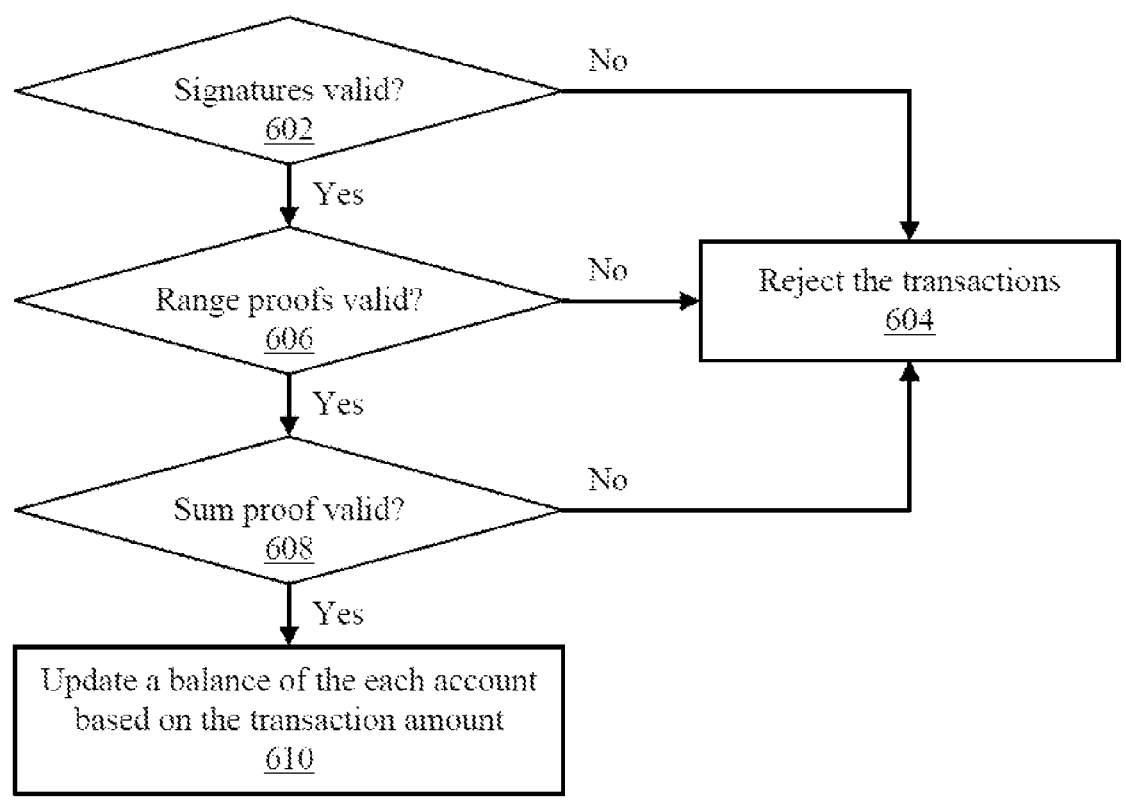
FIG. 6 illustrates a flowchart of an exemplary method for information protection, in accordance with various embodiments.

FIG. 6 illustrates a flowchart of an exemplary method 600 for transaction validation, in accordance with various embodiments. The method 600 may be implemented in various systems including, for example, one or more components of the blockchain network 200 of FIG. 2. The exemplary method 600 may be implemented by one or more of the nodes 202 and/or the user computing devices 240. For example, the method 600 may correspond to the block 504 of the method 500. The operations of the method 600 presented below are intended to be illustrative. Depending on the implementation, the exemplary method 600 may include additional, fewer, or alternative steps performed in various orders or in parallel.

At block 602, it may be determined whether the signatures are valid. If it is determined that any of the signatures is not valid, at block 604, the transactions may be rejected. If it is determined that each of the signatures is valid, at block 606, it may be determined whether the range proof for each of the transactions is valid. If it is determined that any of the range proofs is not valid, the method 600 proceeds to block 604 and the transactions may be rejected. If it is determined that each of the range proofs is valid, at block 608, it may be determined whether the sum proof is valid. If it is determined that the sum proof is not valid, the method 600 proceeds to block 604 and the transactions may be rejected. If it is determined that the sum proof is valid, the method 600 proceeds to block 610 and a balance of the each account may be updated based on the transaction amount associated with the account. The above description describes the validations in an order. A person having ordinary skill should appreciate that the validations can have any order.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques.

Figure 7:
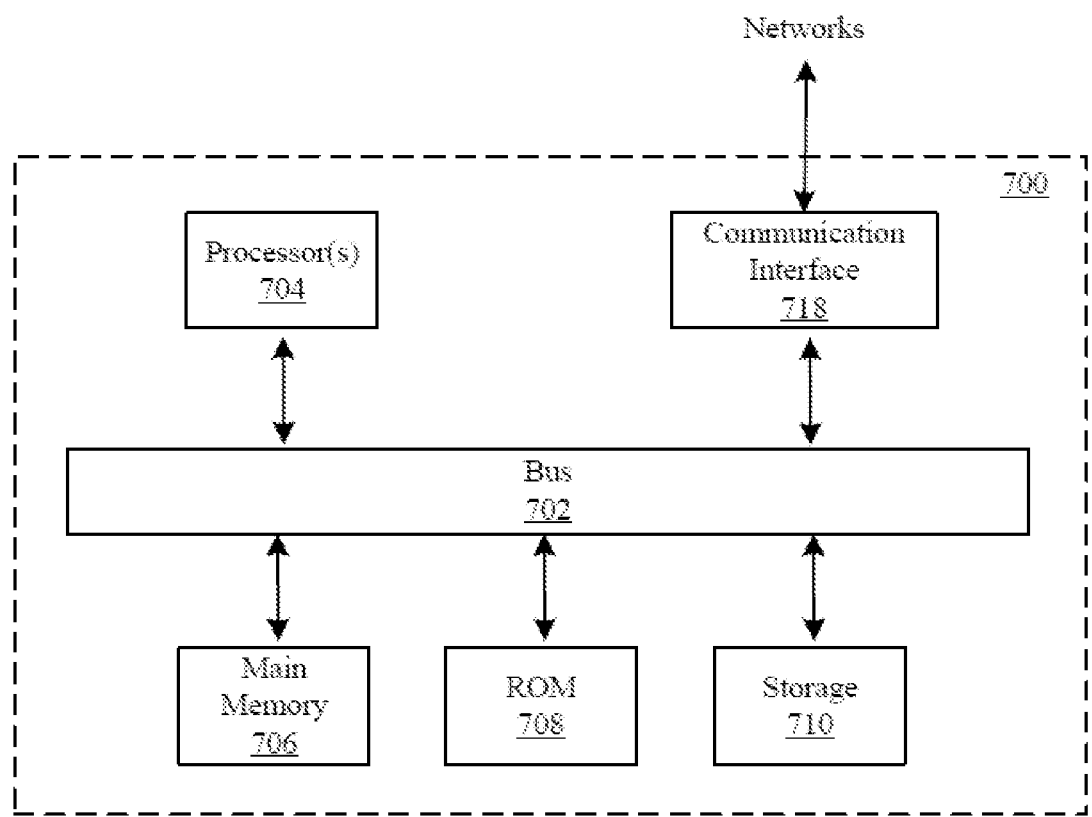
FIG. 7 illustrates a block diagram of an exemplary computer system in which any of the embodiments described herein may be implemented.

FIG. 7 is a block diagram that illustrates an exemplary computer system 700 in which any of the embodiments described herein may be implemented. The system 700 may correspond to the nodes 202 or the user computing devices 240 described above with reference to FIG. 2. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions. The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the operations, methods, and processes described herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The processor(s) 704 may correspond to the processor 204 described above, and the main memory 706, the ROM 708, and/or the storage device 710 may correspond to the memory 206 described above. The main memory 706, the ROM 708, and/or the storage device 710 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicate with a WAN). Wireless links may also be implemented. In any such implementation, communication interface 718 sends and receives electrical, electromagnetic or optical signals that carry digital data streams representing various types of information.

The computer system 700 can send messages and receive data, including program code, through the network(s), network link and communication interface 718. In the Internet example, a server might transmit a requested code for an application program through the Internet, the ISP, the local network and the communication interface 718. The received code may be executed by processor 704 as it is received, and/or stored in storage device 710, or other non-volatile storage for later execution.

Each of the schemes, mechanisms, solutions, processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry. In some embodiments, the processor(s) 704 may be implemented partially or entirely as the one or more logic circuits described above.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various

What is claimed is:

1. An information protection system comprising a first blockchain node and one or more second blockchain nodes, wherein:
the first blockchain node is configured to:
receive a plurality of transaction amounts of one or more unexecuted transactions among a plurality of blockchain accounts that are on a blockchain computer network, wherein each of the plurality of transaction amounts is inbound or outbound relative to one of the plurality of blockchain accounts;
encrypt, according to a homomorphic encryption process, each of the plurality of transaction amounts, wherein the encryption of each of the plurality of transaction amounts at least conceals whether each of the plurality of transaction amounts is inbound or outbound;
generate a sum proof that a product of a sequence comprising the plurality of encrypted transaction amounts is $H^r$, wherein H is a publicly known parameter, r is a random number, and the sum proof at least indicates that the plurality of transaction amounts are balanced;
obtain a plurality of digital signatures by obtaining a digital signature from each of the plurality of accounts, wherein each of the digital signatures indicates an approval of a combination comprising at least the plurality of encrypted transaction amounts associated with the plurality of accounts and the sum proof; and
transmit, over the blockchain computer network, the plurality of encrypted transaction amounts, the plurality of digital signatures, and the sum proof to the one or more second blockchain nodes of the blockchain computer network;
the one or more second blockchain nodes are configured to verify the one or more unexecuted transactions based on the plurality of encrypted transaction amounts, the plurality of digital signatures, and the sum proof without receiving information of whether each of the plurality of transaction amounts is inbound or outbound; and
the first blockchain node and the one or more second blockchain nodes are configured to:
add the verified one or more unexecuted transactions to a blockchain on the blockchain computer network; and
update the blockchain by adding the plurality of encrypted transaction amounts correspondingly to a plurality of balances of the plurality of blockchain accounts that are encrypted according to the homomorphic encryption process.

2. The system of claim 1, wherein:
a current balance of each of the plurality of blockchain accounts is encrypted according to the homomorphic encryption process; and
the one or more second blockchain nodes are configured to update the current balance based on a corresponding encrypted transaction amount without receiving information of whether each of the plurality of transaction amounts is inbound or outbound.

3. The system of claim 1, wherein:
the first blockchain node is configured to, before transmitting the plurality of encrypted transaction amounts and the sum proof to the one or more second blockchain nodes of the blockchain computer network, obtain a plurality of range proofs respectively for the plurality of blockchain accounts, the plurality of range proofs at least indicating that each blockchain account corresponding to an outbound transaction amount has sufficient asset for a corresponding outbound transaction.

4. The system of claim 3, wherein:
the first blockchain node and the one or more second blockchain nodes are configured to add the verified one or more unexecuted transactions comprising the plurality of encrypted transaction amounts, the sum proof, the plurality of range proofs, and the plurality of digital signatures corresponding to the plurality of blockchain accounts to the blockchain on the blockchain computer network.

5. The system of claim 1, wherein two or more of the plurality of transaction amounts are inbound or outbound relative to a same blockchain account.

6. The system of claim 1, wherein the homomorphic encryption process is based on a Pedersen Commitment scheme.

7. A non-transitory computer-readable storage medium storing instructions executable by one or more processors, wherein execution of the instructions causes the one or more processors to perform operations comprising:
receiving a plurality of transaction amounts of one or more unexecuted transactions among a plurality of blockchain accounts that are on a blockchain computer network, wherein each of the plurality of transaction amounts is inbound or outbound relative to one of the plurality of blockchain accounts;
encrypting, according to a homomorphic encryption process, each of the plurality of transaction amounts, wherein the encryption of each of the plurality of transaction amounts at least conceals whether each of the plurality of transaction amounts is inbound or outbound;
generating a sum proof that a product of a sequence comprising the plurality of encrypted transaction amounts is $H^r$, wherein H is a publicly known parameter, r is a random number, and the sum proof at least indicates that the plurality of transaction amounts are balanced;
obtaining a plurality of digital signatures by obtaining a digital signature from each of the plurality of accounts, wherein each of the digital signatures indicates an approval of a combination comprising at least the plurality of encrypted transaction amounts associated with the plurality of accounts and the sum proof;
storing, over the blockchain computer network, the plurality of encrypted transaction amounts, the plurality of digital signatures, and the sum proof to a blockchain on the blockchain computer network; and
updating the blockchain by adding the plurality of encrypted transaction amounts correspondingly to a plurality of balances of the plurality of blockchain accounts that are encrypted according to the homomorphic encryption process.

8. The non-transitory computer-readable storage medium of claim 7, wherein storing the plurality of encrypted transaction amounts, the plurality of digital signatures, and the sum proof to the blockchain comprises transmitting the plurality of encrypted transaction amounts and the sum proof to one or more blockchain nodes of the blockchain computer network for the one or more blockchain nodes to (1) verify the one or more unexecuted transactions without receiving information of whether each of the plurality of transaction amounts is inbound or outbound and (2) add verified transactions corresponding to the plurality of encrypted transaction amounts to the blockchain.

9. The non-transitory computer-readable storage medium of claim 7, wherein:
   updated balances of the plurality of blockchain accounts remain encrypted based on homomorphic encryption process and hide away whether each of the plurality of transaction amounts is inbound or outbound.

10. The non-transitory computer-readable storage medium of claim 7, wherein before storing the plurality of encrypted transaction amounts and the sum proof to the blockchain, the operations further comprise:
   obtaining a plurality of range proofs respectively for the plurality of blockchain accounts, the plurality of range proofs at least indicating that each blockchain account corresponding to an outbound transaction amount has sufficient asset for a corresponding outbound transaction.

11. The non-transitory computer-readable storage medium of claim 10, wherein:
   the plurality of digital signatures respectively corresponding to the plurality of blockchain accounts each certify a combination of the plurality of encrypted transaction amounts, the plurality of range proofs, and the sum proof; and
   storing the plurality of encrypted transaction amounts and the sum proof to the blockchain comprises storing the plurality of encrypted transaction amounts, the sum proof, the plurality of range proofs, and the plurality of digital signatures to the blockchain.

12. The non-transitory computer-readable storage medium of claim 11, wherein storing the plurality of encrypted transaction amounts, the sum proof, the plurality of range proofs, and the plurality of digital signatures to the blockchain comprises:
   transmitting the plurality of encrypted transaction amounts, the sum proof, the plurality of range proofs, and the plurality of digital signatures to one or more blockchain nodes of the blockchain computer network for the one or more blockchain nodes to verify the one or more unexecuted transactions based on the plurality of encrypted transaction amounts, the sum proof, the plurality of range proofs, and the plurality of digital signatures without receiving information of whether each of the plurality of transaction amounts is inbound or outbound.

13. The non-transitory computer-readable storage medium of claim 7, wherein two or more of the plurality of transaction amounts are inbound or outbound relative to a same blockchain account.

14. The non-transitory computer-readable storage medium of claim 7, wherein the homomorphic encryption process is based on a Pedersen Commitment scheme.

15. A computer-implemented information protection method, comprising:
   receiving a plurality of transaction amounts of one or more unexecuted transactions among a plurality of blockchain accounts that are on a blockchain computer network, wherein each of the plurality of transaction amounts is inbound or outbound relative to one of the plurality of blockchain accounts;
   encrypting, according to a homomorphic encryption process, each of the plurality of transaction amounts, wherein the encryption of each of the plurality of transaction amounts at least conceals whether each of the plurality of transaction amounts is inbound or outbound;
   generating a sum proof that a product of a sequence comprising the plurality of encrypted transaction amounts is $H^r$, wherein H is a publicly known parameter, r is a random number, and the sum proof at least indicates that the plurality of transaction amounts are balanced;
   obtaining a plurality of digital signatures by obtaining a digital signature from each of the plurality of accounts, wherein each of the digital signatures indicates an approval of a combination comprising at least the plurality of encrypted transaction amounts associated with the plurality of accounts and the sum proof;
   storing, over the blockchain computer network, the plurality of encrypted transaction amounts, the plurality of digital signatures, and the sum proof to a blockchain on the blockchain computer network; and
   updating the blockchain by adding the plurality of encrypted transaction amounts correspondingly to a plurality of balances of the plurality of blockchain accounts that are encrypted according to the homomorphic encryption process.

16. The method of claim 15, wherein storing the plurality of encrypted transaction amounts, the plurality of digital signatures, and the sum proof to the blockchain comprises transmitting the plurality of encrypted transaction amounts and the sum proof to one or more blockchain nodes of the blockchain computer network for the one or more blockchain nodes to (1) verify the one or more unexecuted transactions without receiving information of whether each of the plurality of transaction amounts is inbound or outbound and (2) add verified transactions corresponding to the plurality of encrypted transaction amounts to the blockchain.

17. The method of claim 15, wherein:
   updated balances of the plurality of blockchain accounts remain encrypted based on homomorphic encryption process and hide away whether each of the plurality of transaction amounts is inbound or outbound.

18. The method of claim 15, before storing the plurality of encrypted transaction amounts and the sum proof to the blockchain, further comprising:
   obtaining a plurality of range proofs respectively for the plurality of blockchain accounts, the plurality of range proofs at least indicating that each blockchain account corresponding to an outbound transaction amount has sufficient asset for a corresponding outbound transaction.

19. The method of claim 18, wherein:
   the plurality of digital signatures respectively corresponding to the plurality of blockchain accounts each certify a combination of the plurality of encrypted transaction amounts, the plurality of range proofs, and the sum proof; and
   storing the plurality of encrypted transaction amounts and the sum proof to the blockchain comprises storing the plurality of encrypted transaction amounts, the sum proof, the plurality of range proofs, and the plurality of digital signatures to the blockchain.

20. The method of claim 19, wherein storing the plurality of encrypted transaction amounts, the sum proof, the plurality of range proofs, and the plurality of digital signatures to the blockchain comprises:
   transmitting the plurality of encrypted transaction amounts, the sum proof, the plurality of range proofs, and the plurality of digital signatures to one or more blockchain nodes of the blockchain computer network for the one or more blockchain nodes to verify the one or more unexecuted transactions based on the plurality of encrypted transaction amounts, the sum proof, the plurality of range proofs, and the plurality of digital signatures without receiving information of whether each of the plurality of transaction amounts is inbound or outbound.

* * * * *